(No Model.)
P. B. SPEER.
PADDLE WHEEL FOR STEAMBOATS.
No. 513,836. Patented Jan. 30, 1894.
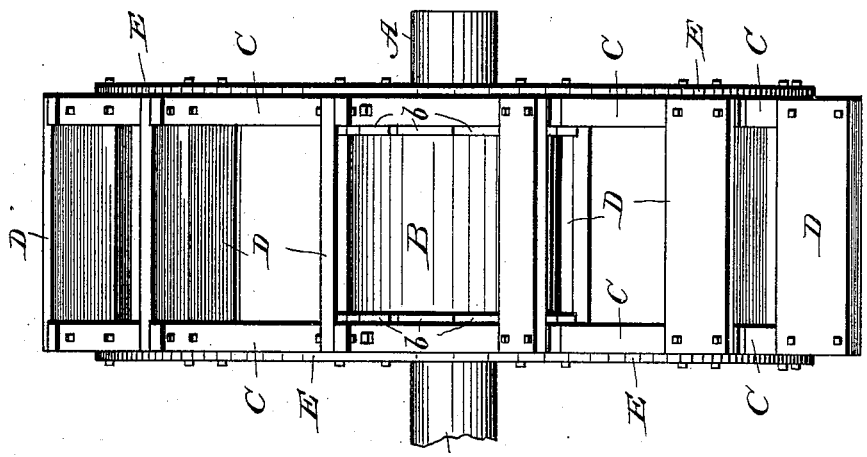
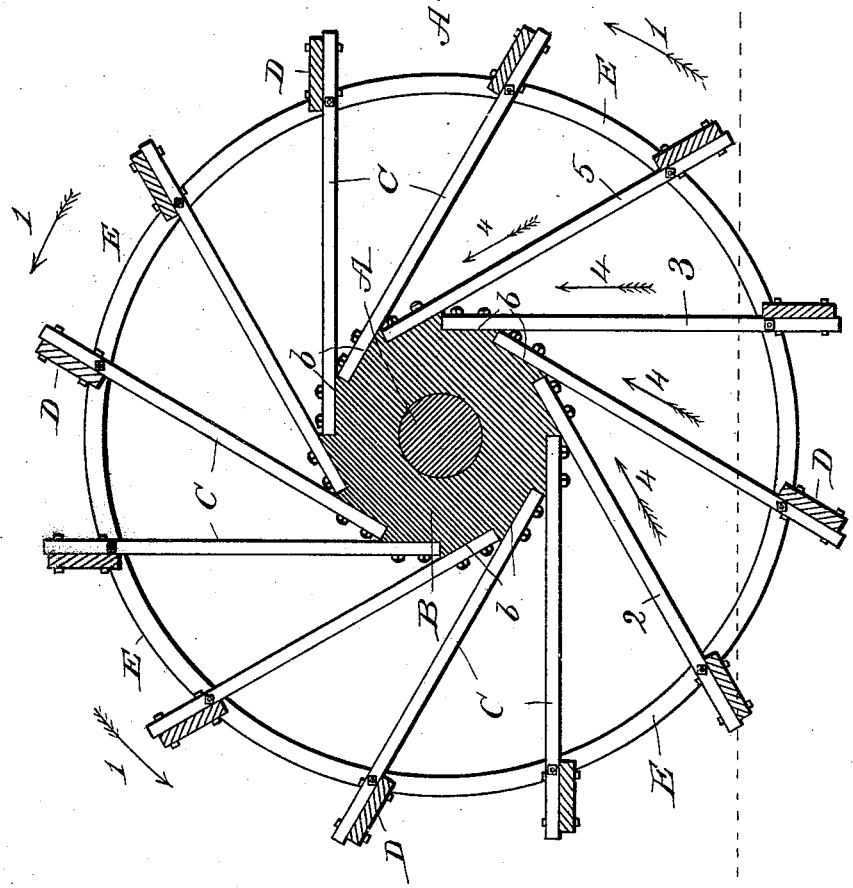
Witnesses:
Wm A. Schoenborn
James R. Mansfield
Inventor:
Porter B. Speer
by
Alexander H. Dowell
atty

UNITED STATES PATENT OFFICE.

PORTER B. SPEER, OF MUSCATINE, IOWA.

PADDLE-WHEEL FOR STEAMBOATS.

SPECIFICATION forming part of Letters Patent No. 513,836, dated January 30, 1894.

Application filed January 11, 1893. Serial No. 457,996. (No model.)

*To all whom it may concern:*

Be it known that I, PORTER B. SPEER, of Muscatine, in the county of Muscatine and State of Iowa, have invented certain new and useful Improvements in Paddle-Wheels for Steamboats; and I do hereby declare that the following is a full, clear, and exact description thereof, reference being had to the accompanying drawings, and to the letters and figures of reference marked thereon, which form part of this specification.

This invention is an improvement in paddle wheels for side-wheel steamboats, and it consists in the novel construction and combination of parts hereinafter described and claimed.

Figure 1 represents a vertical longitudinal section of a wheel constructed in accordance with my invention. Fig. 2 is an edge view thereof.

A is the driving shaft on which the wheel is mounted.

B is the hub which may have a series of ratchet facets b.

C, C, are the spokes or arms secured at their inner ends to the facets b of the wheel and stand tangential to the hub, and the inner end of one spoke would, if prolonged, intersect the next spoke, and they would never reach a common center, as would the spokes in an ordinary wheel. The paddles D are rigidly fastened broadside to the outer ends of the spokes. The outer ends of the spokes may be connected and braced by metallic hoops E.

The wheel, in driving a vessel, is rotated in the direction indicated by arrows 1; this causes the spokes and paddles at the descending side to enter the water almost broadside as at spoke 2, and then they gradually assume a vertical position which is reached when the spoke has passed behind the shaft, as indicated at spoke 3. By reason of the tangential setting of the spokes, they and the paddles are "pulled" through the water from front to rear of the shaft, as indicated by arrows 4, so that the spokes are in a great measure relieved of the lateral thrust and deflection incident thereto that would occur if the spokes were secured radially to the hub. The paddles are therefore drawn almost edgewise out of the water as indicated at 5 and do not present sufficient surface to raise the water; consequently the whole motive power can be utilized to force the paddles into and through the water between the points 2 and 3, and the extra compression of water under the entering paddles only increases the propelling effect of the wheels.

The ratchet-facets of the hub enable me to set the spokes at greater angles to the shaft, and to procure more bearing surface for them upon the hub than if an ordinary octagonal or other multisided hub, having regular sides, was used; furthermore it gives each spoke an end bearing directly against the hub so that in backing-water the strain on the spokes is confined entirely to the hub and not transmitted to the adjoining spokes, nor borne entirely by the spoke-fastening bolts.

I am aware that paddles affixed at angles to arms attached to the spokes, "feathering" blades and buckets or paddles affixed tangentially to the peripheries of drums or wheels have been heretofore used, and such I specifically disclaim.

I am also aware that tangential spokes and blades have been before used, and therefore What I claim as new is—

1. The herein described paddle wheel having a hub secured to the drive shaft formed with faceted ends; pairs of spokes having their inner ends secured to facets on the opposite ends of the hub; paddles connecting the outer ends of the spokes in each pair and rigidly secured directly thereto flatwise, and the brace hoops attached to the spokes at each side of the wheel, all substantially as specified.

2. The combination of the hub having a series of ratchet-facets b on its periphery, pairs of spokes C, C, having their inner ends secured to the said ratchet-facets of the hub, and the paddles D, secured directly to and connecting the outer ends of the spokes in each pair, all substantially as specified.

In testimony that I claim the foregoing as my own I affix my signature in presence of two witnesses.

PORTER B. SPEER.

Witnesses:
T. R. FITZGERALD,
H. C. MCALISTER.